(12) United States Patent
Kimizuka et al.

(10) Patent No.: US 10,561,901 B2
(45) Date of Patent: Feb. 18, 2020

(54) METHOD OF EVALUATING STABILITY OF GOLF SWING

(71) Applicant: SUMITOMO RUBBER INDUSTRIES, LTD., Kobe-shi, Hyogo (JP)

(72) Inventors: Wataru Kimizuka, Kobe (JP); Masahide Onuki, Kobe (JP); Hiroshi Hasegawa, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 15/826,186

(22) Filed: Nov. 29, 2017

(65) Prior Publication Data
US 2018/0147447 A1 May 31, 2018

(30) Foreign Application Priority Data
Nov. 30, 2016 (JP) .................................. 2016-232928

(51) Int. Cl.
*A63B 69/36* (2006.01)
*A63B 24/00* (2006.01)
*G06K 9/00* (2006.01)

(52) U.S. Cl.
CPC .......... *A63B 24/0006* (2013.01); *A63B 69/36* (2013.01); *G06K 9/00342* (2013.01); *A63B 2069/3602* (2013.01)

(58) Field of Classification Search
CPC ...................... G06K 9/00335; G06K 9/00342; G06F 3/011; G06F 19/3481; G16H 20/30; A63B 69/36; A63B 24/0006; A63B 2069/3602

USPC .......................................................... 700/91
See application file for complete search history.

(56) References Cited

U.S. PATENT DOCUMENTS

| 2011/0230985 A1 | 9/2011 | Niegowski et al. |
| 2013/0274904 A1* | 10/2013 | Coza .................... G06F 3/011 700/91 |
| 2016/0027325 A1* | 1/2016 | Malhotra ............ G06F 19/3481 434/252 |
| 2016/0151696 A1* | 6/2016 | Chen ................... A63B 69/3614 473/199 |

(Continued)

FOREIGN PATENT DOCUMENTS

| JP | 2013-90862 A | 5/2013 |
| JP | 2014-512219 A | 5/2014 |
| JP | 2016-221130 A | 12/2016 |

OTHER PUBLICATIONS

Japanese Office Action issued in Japanese Application No. 2016-232928 dated Dec. 5, 2017, together with an English translation.

*Primary Examiner* — Raleigh W Chiu
(74) *Attorney, Agent, or Firm* — Birch, Stewart, Kolasch & Birch, LLP

(57) ABSTRACT

Provided is a method of evaluating stability of a golf swing. The method comprises calculating a force indicator that represents a force that acts on a body of a golfer during the golf swing and evaluating stability of the golf swing according to a magnitude of the force indicator. In the calculating, the force indicator may be calculated during the golf swing made with a specific golf club, and in the evaluating, the stability of the golf swing may be evaluated as a characteristic of the specific golf club, in accordance with the magnitude of the force indicator.

11 Claims, 13 Drawing Sheets

(56) References Cited

U.S. PATENT DOCUMENTS

2017/0120122 A1* 5/2017 Hagiwara .............. A63B 60/46
2017/0239519 A1* 8/2017 Ishihara ............... A61B 5/6895
2018/0147447 A1* 5/2018 Kimizuka .......... A63B 24/0006

* cited by examiner

METHOD OF EVALUATING STABILITY OF GOLF SWING

CROSS REFERENCE TO RELATED APPLICATION

This application claims a priority to Japanese Patent Application No. 2016-232928 filed on Nov. 30, 2016, which is hereby incorporated by reference in its entirety.

FIELD OF INVENTION

The present invention relates to a method of evaluating the stability of a golf swing and an apparatus for the same, and also to method of specifying a factor that determines the stability of a golf swing.

BACKGROUND

Conventionally, various techniques have been proposed for analyzing a golf swing with the goal of performing swing evaluation and the like in order to perform golf goods development, select a golf club that suits a golfer (perform so-called fitting), and improve one's golf skill. In JP 2013-90862A, in order to achieve an improvement in golf swing, the force transferred to a golf club during golf swings is derived in order to discover a golf swing that realizes an efficient transfer of energy from the golfer's arm to the golf club. Also, in JP 2013-90862A, the force that acts at the center of a line that connects the golfer's shoulders is calculated in the process of deriving the force transferred to the golf club.

Incidentally, in golf, the ability to stably hit a ball in a straight line for a long distance leads to an improvement in score. Accordingly, there is significance in evaluating golf swing stability. However, conventionally, the causes of variation in golf swings have not been sufficiently understood, and an appropriate indicator that enables evaluating the stability of a golf swing has not been known. For this reason, in order to evaluate the stability of a golf swing, it has been necessary to, for example, actually collect data for a large number of golf swings, and then investigate whether the hitting of the balls is stable. However, in situations where the stability of a golf swing needs to be evaluated, such as when developing golf goods and performing golf club fitting, actually collecting data for a large number of golf swings is not only inefficient, but also sometimes unrealistic.

SUMMARY of INVENTION

One object of the present invention is to efficiently evaluate the stability of a golf swing. Another object of the present invention is to efficiently discover a factor that determines the stability of a golf swing.

A method according to a first aspect of the present invention is a method of evaluating stability of a golf swing, including: a step of calculating a force indicator that represents a force that acts on a body of a golfer during the golf swing; and a step of evaluating stability of the golf swing according to a magnitude of the force indicator.

A method according to a second aspect of the present invention is the method according to the first aspect, wherein in the calculating step, the force indicator is calculated during the golf swing made with a specific golf club. Also, in the evaluating step, the stability of the golf swing is evaluated as a characteristic of the specific golf club, in accordance with the magnitude of the force indicator.

A method according to a third aspect of the present invention is the method according to the first or second aspect, wherein the force that acts on the body is a force that acts on the body of the golfer due to an inertial force that includes a centrifugal force generated during the golf swing.

A method according to a fourth aspect of the present invention is the method according to any of the first to third aspects, wherein in the evaluating step, the smaller the force that acts on the body of the golfer is, the higher stability of the golf swing is determined to be.

A method according to a fifth aspect of the present invention is the method according to any of the first to fourth aspects, wherein the force that acts on the body is a force that acts on a trunk of the golfer. Note that the trunk is, for example, the center between the shoulders of the golfer, the left shoulder, the right shoulder, the center of the backbone, or the center of the waist.

A method according to a sixth aspect of the present invention is the method according to any of the first to fifth aspects, wherein the force that acts on the body includes a component of a force that acts on the body of the golfer in a forward-backward direction.

A method according to a seventh aspect of the present invention is the method according to any of the first to sixth aspects, wherein the calculating step includes a step of calculating a plurality of the force indicators that respectively correspond to golf swings made with a plurality of golf clubs. Also, the evaluating step includes a step of comparing the plurality of golf clubs in terms of the stability of the golf swing by comparing the plurality of force indicators.

A method according to an eighth aspect of the present invention is the method according to any of the first to seventh aspects, wherein the calculating step includes a step of calculating a plurality of the force indicators that respectively correspond to golf swings made by a plurality of golfers. Also, the evaluating step includes a step of comparing the plurality of golfers in terms of the stability of the golf swing by comparing the plurality of force indicators.

A method according to a ninth aspect of the present invention is the method according to any of the first to eighth aspects, wherein in the calculating step, the force indicator is calculated based on a result of actual measurement or simulation of the golf swing.

An apparatus according to a tenth aspect is an apparatus for evaluating stability of a golf swing, including: a calculation unit configured to calculate a force indicator that represents a force that acts on a body of a golfer during the golf swing; and an evaluation unit configured to determine stability of the golf swing in accordance with the force indicator.

A method according to an eleventh aspect of the present invention is a method of specifying a factor that determines stability of a golf swing, including: a step of calculating a plurality of force indicators that each represent a force that acts on a body of a golfer during golf swings made with a plurality of golf clubs, the plurality of golf clubs each having a different value of a parameter that indicates a physical property; and a step of comparing the plurality of golf clubs in terms of the stability of the golf swing in accordance with magnitudes of the plurality of force indicators, and determining such a direction of change in the parameter as to improve the stability of the golf swing.

The inventors of the present invention found that one factor that inhibits the stability of a golf swing and causes ball hitting variation is force that acts on the body of a golfer during a golf swing. For example, during a golf swing, rotational movement of the golf club is accompanied by inertial force such as centrifugal force that acts on the body of the golfer. The body of the golfer is pulled by such force, thus losing balance, which results in golf swing variation.

According to the first aspect of the present invention, based on the above findings, a force indicator that represents a force that acts on the body of the golfer during the golf swing is calculated as an indicator for evaluating the stability of the golf swing. By using that force indicator as a determination reference, it is possible to efficiently evaluate golf swing stability.

Also, according to the eleventh aspect of the present invention, based on the above findings, a force indicator is calculated that represents a force that acts on the body of the golfer during golf swings made with multiple golf clubs that each have a different parameter that indicates a physical property. The stability of the golf swings made using the respective golf clubs is compared using these force indicators as a determination reference. Based on the comparison results, it is determined which direction of change in the value of the parameter results in an improvement in golf swing stability (e.g., it is determined whether an increase in the value or a decrease in the value results in an improvement in stability). Accordingly, it is possible to efficiently find a factor that determines the stability of a golf swing.

DETAILED DESCRIPTION OF THE PREFERRED EMBODIMENTS

Figure 1:
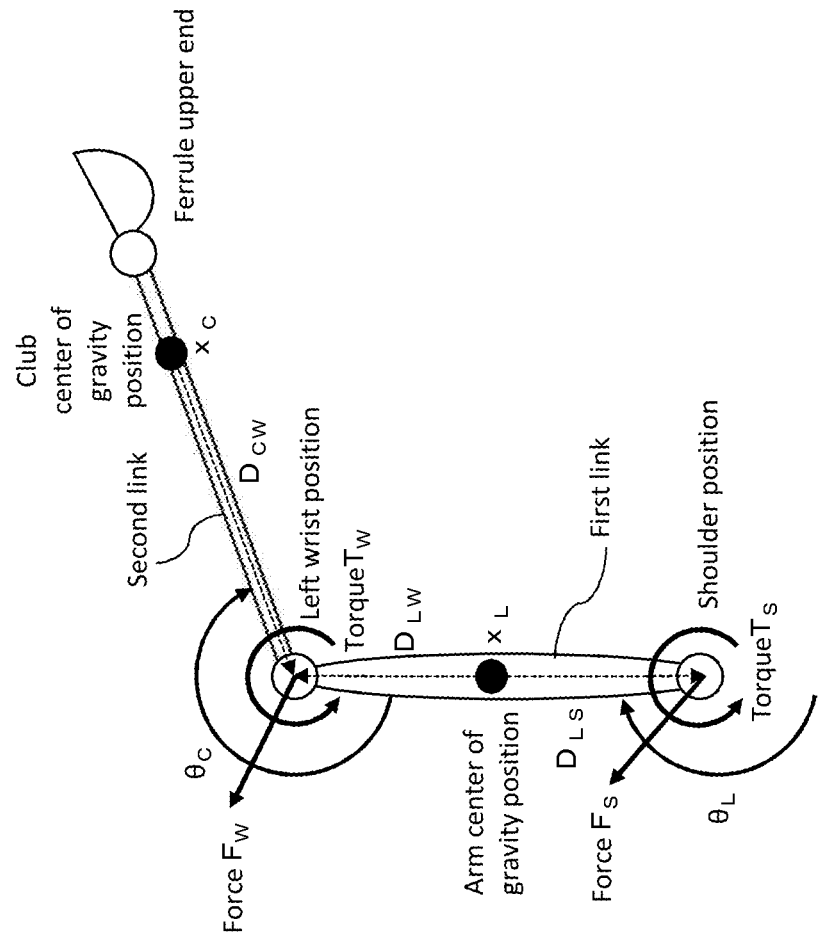
FIG. 1 is a diagram illustrating a model for calculating a force $F_S$ that acts on the body of a golfer.

First, the following describes findings made by the inventors of the present invention, which can also be said to be the principle of the present invention, as well as an experiment performed in order to verify these findings. This is followed by a description of a method of evaluating the stability of a golf swing and an apparatus for the same, and a method of specifying a factor that determines the stability of a golf swing according to embodiments of the present invention, which are realized based on the aforementioned findings.

1. Principle 1-1. Findings

The inventors of the present invention found that one factor that inhibits the stability of a golf swing and causes ball hitting variation is force that acts on the body of a golfer, typically the trunk thereof, during a golf swing. Specifically, one reason that variation occurs in golf swings is that the golfer does not maintain body balance during golf swings, that is to say, the body of the golfer sways more or less. Also, this loss of balance is typically thought to be caused by inertial force such as centrifugal force that is generated along with rotational movement of the golf club during a golf swing. In other words, the body of the golfer is pulled by such force, thus losing balance, which results in golf swing variation. Accordingly, it is thought that the smaller the force that acts on and pulls the body of the golfer during a golf swing is, the more stable ball hitting is.

The inventors of the present invention also found that the more flexible the shaft of a golf club is, the smaller the force pulling the body of the golfer during a golf swing is.

1-2. Experiment

The inventors of the present invention confirmed that the above findings are correct through an experiment. This experiment was performed as described below. First, two types of golf clubs having different degrees of shaft flex (flexibility) were each swung multiple times by 13 test subjects, and measurements regarding the swings were obtained using a motion capture system. The same driver head and same grip were used with each golf club, and the club lengths were also the same at 46.5 inches. It should be noted that the only difference between the two golf clubs was that a shaft having a club vibration frequency of 215 cpm (signifying a reference) was used with one golf club (referred to hereinafter as the reference golf club), and a shaft having a club vibration frequency of 195 cpm (signifying higher flexibility than the reference) was used with the other golf club (referred to hereinafter as the flexible golf club). The club vibration frequency was measured using the method described in paragraph 0034 of JP 2015-188681A.

A three-dimensional motion analysis system (VICON) that includes multiple infrared cameras was used as the motion capture system. Infrared reflection markers were attached to the left shoulder, the right shoulder, the thumb side of the left wrist, and the pinkie side of the left wrist of each test subject, and also to the upper end of the ferrule of each golf club, and the golf swings were captured from multiple directions by the infrared cameras. Next, the captured videos were subjected to image processing using a computer, and the three-dimensional coordinates of the markers during the golf swings were calculated. Furthermore, inverse dynamics calculation was performed based on the three-dimensional coordinates of the markers so as to calculate a force $F_S$ acting at the center of a line connecting the left shoulder and the right shoulder (sometimes referred to hereinafter as the shoulder position in order to represent the center between the two shoulders) as the force acting in the trunk of the golfer during the golf swing.

Figure 2:
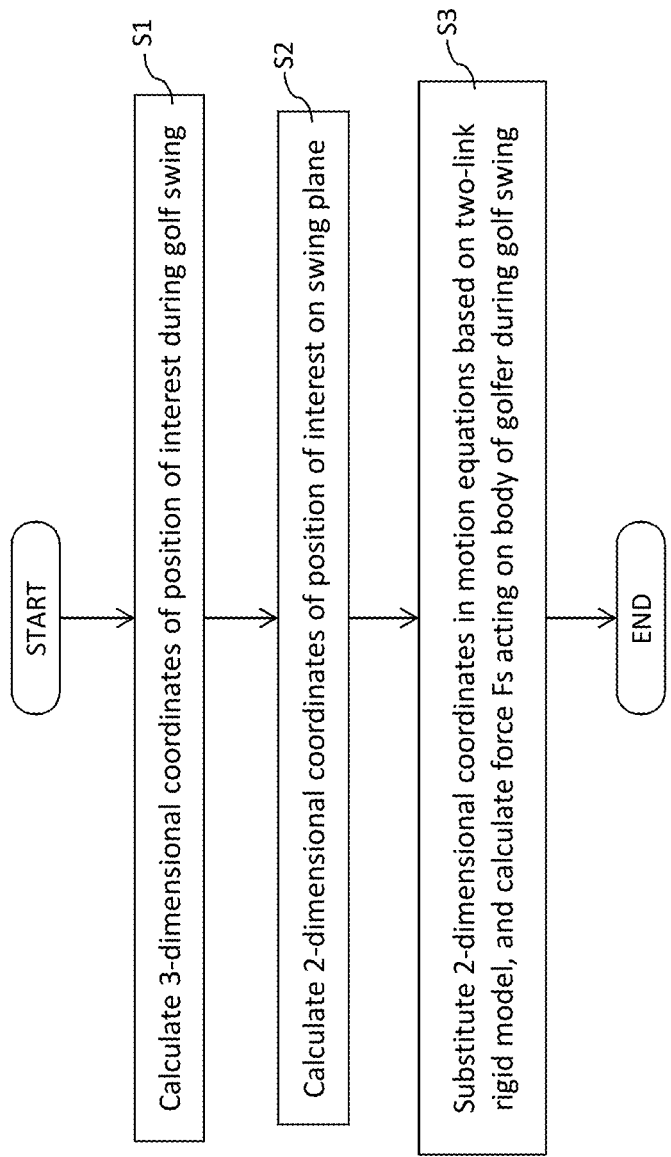
FIG. 2 is a flowchart showing a flow of a method of calculating the force $F_S$ acting on the body of a golfer.

Here, the force $F_S$ acting at the shoulder position was calculated using the method showing in the flowchart of FIG. 2 in accordance with a two-link rigid model as shown in FIG. 1. The first link in FIG. 1 is the result of modelling the two arms of the golfer as one rigid body, and is a link that connects the shoulder position to the center of a line connecting the thumb side of the left wrist and the pinkie side of the left wrist (sometimes referred to hereinafter as the left wrist position in order to represent the center of the left wrist). Also, the second link is the result of modelling the golf club, and is a link that connects the left wrist position to the position of the upper end of the ferrule.

Regarding the calculation method shown in FIG. 2, first, in step S1, the motion capture system acquires the three-dimensional coordinates of the left shoulder, the right shoulder, the thumb side of the left wrist, the pinkie side of the left wrist, and the upper end of the ferrule during a golf swing. Then, based on these three-dimensional coordinates, the three-dimensional coordinates of the shoulder position and the left wrist position are calculated.

Next, the three-dimensional coordinates of the center of gravity position of a virtual arm (referred to hereinafter as simply the arm center of gravity position) are calculated based on the three-dimensional coordinates of the shoulder position and the left wrist position. Also, the three-dimensional coordinates of the center of gravity position of a virtual golf club (referred to hereinafter as simply the club center of gravity position) are calculated based on the three-dimensional coordinates of the left wrist position and the upper end of the ferrule and the specifications of the golf club.

Next, in step S2, a swing plane is defined. Here, the swing plane is defined based on three positions of the upper end of the ferrule at three times, namely the time when a line segment connecting the left wrist position and the upper end of the ferrule is vertical in a view from the front of the golfer, the time when that line segment is horizontal in a view from the same direction, and the time of impact. More specifically, the swing plane is defined as the plane that passes through these three positions.

Next, the shoulder position, the arm center of gravity position, the left wrist position, and the club center of gravity position are projected on the swing plane, and $x_C$, $x_L$, $\theta_C$, $\theta_L$, $D_{CW}$, $D_{LS}$, and $D_{LW}$ are calculated on the swing plane. $x_C$ represents the club center of gravity position, $x_L$ represents the arm center of gravity position, $\theta_C$ represents the angle of the golf club (the angle of the second link), $\theta_L$ represents the virtual arm angle (the angle of the first link), $D_{CW}$ represents a vector from the club center of gravity position to the left wrist position, $D_{LS}$ represents a vector from the arm center of gravity position to the shoulder position, and $D_{LW}$ represents a vector from the arm center of gravity position to the left wrist position.

The following motion equations were used with respect to translation and rotation of the virtual arm and golf club in the two-link rigid model. Note that $F_S$ is the force acting at the shoulder position, and $F_W$ is the force acting at the left wrist position. Also, $T_S$ is the torque acting at the shoulder position, and $T_W$ is the torque acting at the left wrist position. Furthermore $m_C$ is the weight of the golf club, $I_C$ is the moment of inertia about the center of gravity of the golf club, $m_L$ is the weight of the virtual arm, $I_L$ is the moment of inertia about the center of gravity of the virtual arm, and g is the gravitational acceleration.

$$m_C \ddot{x}_C = F_W + m_C g$$

$$I_C \ddot{\theta}_C = T_W + D_{CW} \times F_W$$

$$m_L \ddot{x}_L = F_S - F_W + m_L g$$

$$I_L \ddot{\theta}_L = T_S - T_W + D_{LS} \times F_S + D_{LW} \times (-F_W) \quad \text{Expression 1}$$

In step S3, the force $F_S$ acting at the shoulder position (center between the shoulders of the golfer) during the golf swing is calculated by substituting the aforementioned variables in the above motion equations. Note that the values of $m_C$, $m_L$, $I_C$, $I_L$ are constants. This completes the detailed description of the calculation method shown in FIG. 2.

Also, in this experiment, the hit point and flight-distance were measured for each swing made by the 13 test subjects in order to observe variation in golf swings. The hit point was measured with use of a shot marker (impact marker) that was affixed to the face surface of the golf club. The flight-distance was measured with use of a distance measuring instrument by a measurement performer waiting in the vicinity of the estimated ball arrival position.

Figure 3:
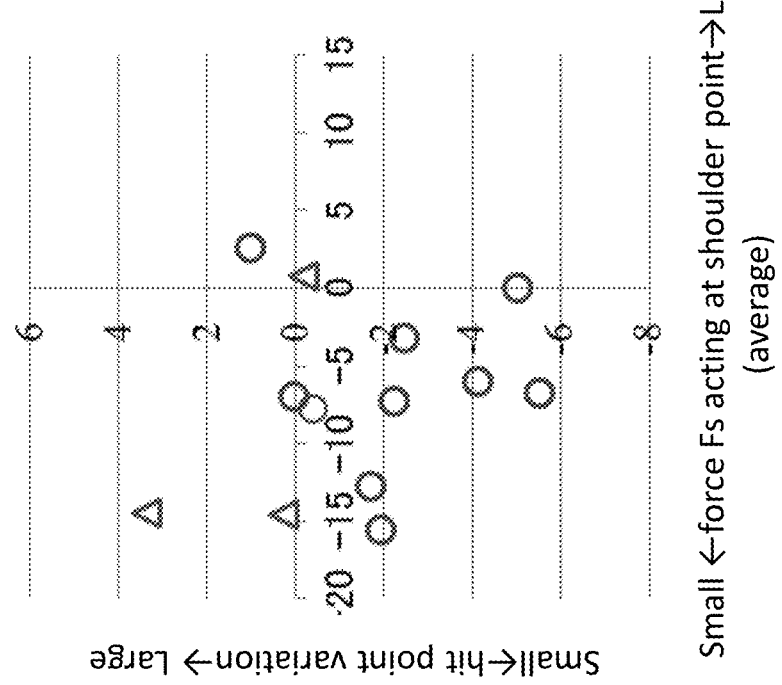
FIG. 3 is a graph showing a relationship between force $F_S$ (average) and hit point variation.
Figure 4:
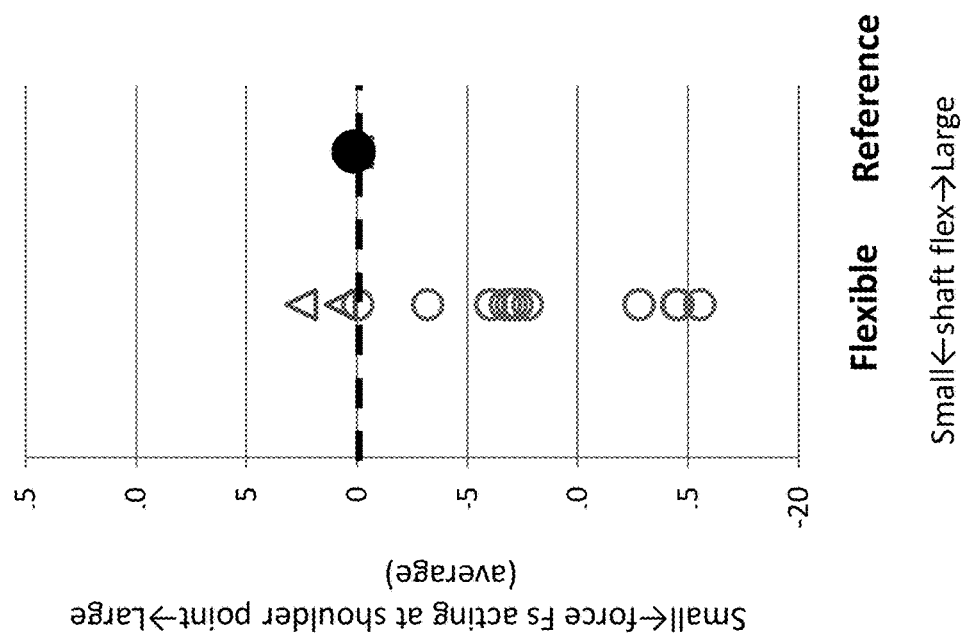
FIG. 4 is a graph showing a relationship between shaft flex and force $F_S$ (average).
Figure 5:
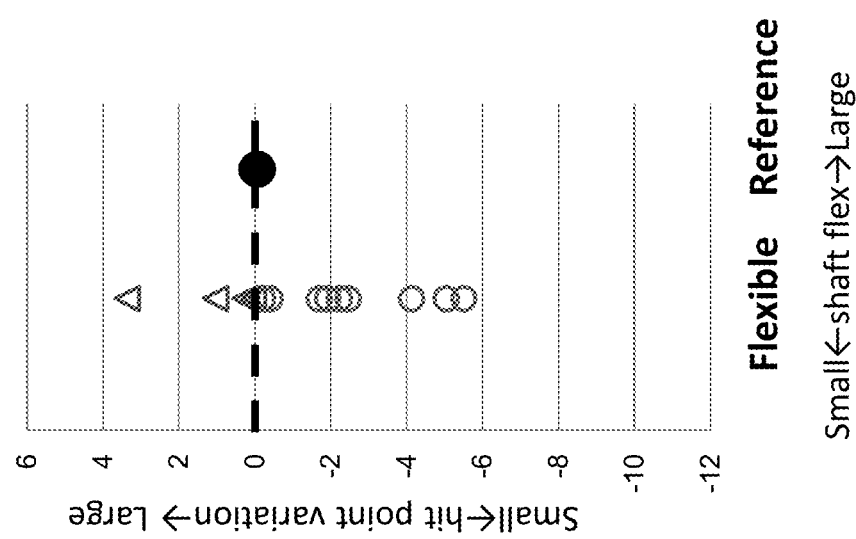
FIG. 5 is a graph showing a relationship between shaft flex and hit point variation.

The force $F_S$, the hit point, and the flight-distance were calculated for each of multiple swings of the reference golf club and the flexible golf club by the 13 test subjects, and the data was organized, thus obtaining the results shown in FIGS. 3 to 7. FIG. 3 is a graph showing the relationship between force $F_S$ (average) and hit point variation, FIG. 4 is a graph showing the relationship between shaft flex and force $F_S$ (average), and FIG. 5 is a graph showing the relationship between shaft flex and hit point variation. More specifically, the vertical axes in FIGS. 3 and 5 represent a value obtained by subtracting the hit point variation (standard deviation) when a test subject swung the reference golf club from the hit point variation (standard deviation) when the same test subject swung the flexible golf club. The horizontal axis in FIG. 3 and the vertical axis in FIG. 4 represent a value obtained by subtracting the force $F_S$ (average) when a test subject swung the reference golf club from the force $F_S$ (average) when the same test subject swung the flexible golf club.

Figure 8:
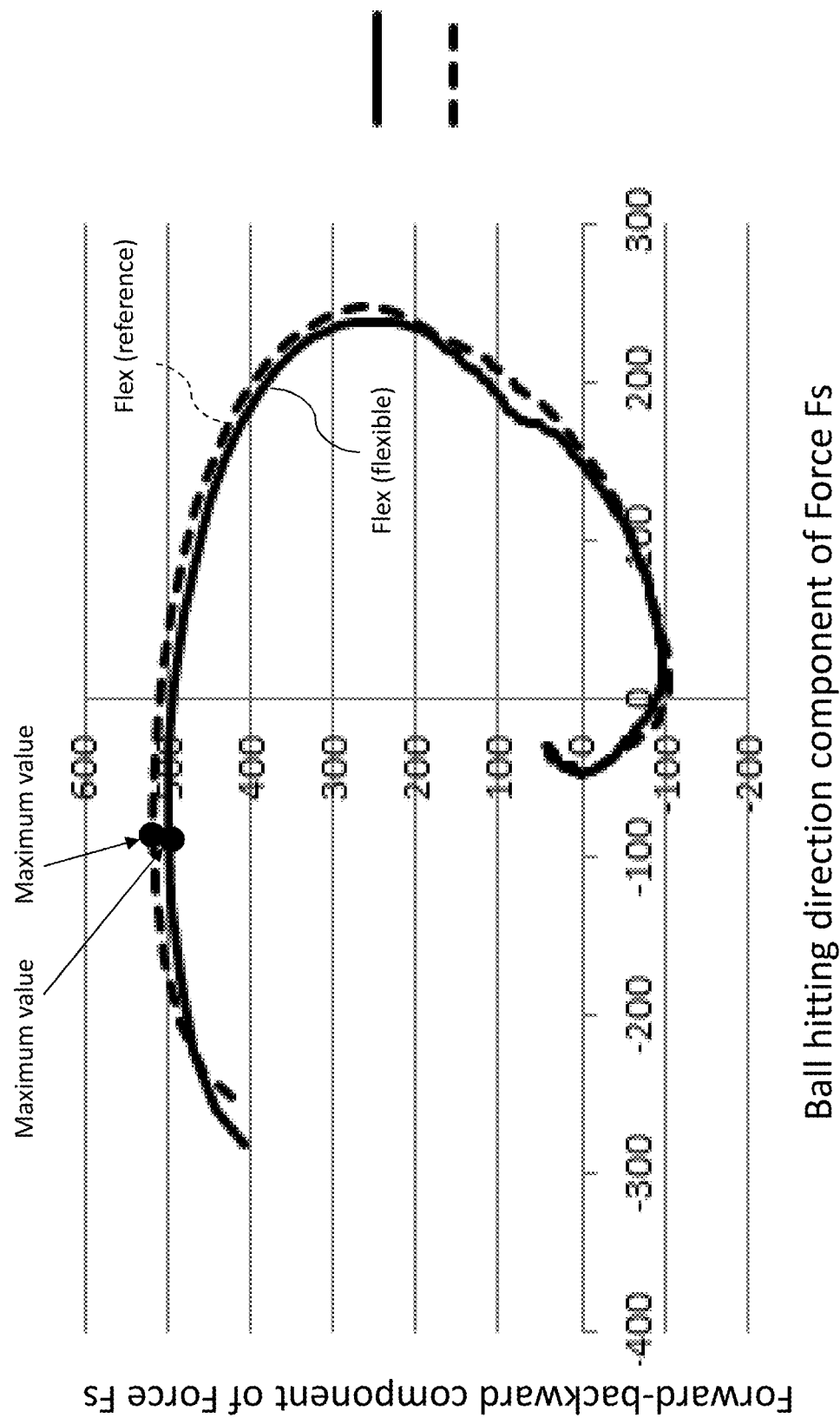
FIG. 8 is a graph showing force $F_S$ during a golf swing.

Given the same magnitude of force, a person's body is more likely to lose balance when force is applied in the forward-backward direction than in the ball hitting direction (left-right direction). Also, a golfer more often sways forward than backward during a golf swing. Accordingly, when evaluating the stability of a golf swing, it is thought to be preferable to focus on force that acts on the body of the golfer in the forward-backward direction, particularly the force pulling the body forward. For this reason, more accurately, the force $F_S$ shown on the horizontal axis in FIG. 3 and the vertical axis in FIG. 4 represents the maximum value (see FIG. 8) of the forward-backward component of the force $F_S$ during the golf swing. FIG. 8 is a graph showing the force $F_S$ during a golf swing, with the vertical axis representing the forward-backward component and the horizontal axis representing the left-right (ball hitting direction) component.

In FIG. 3, data regarding 10 out of the 13 test subjects is plotted in the first quadrant and the third quadrant. Accordingly, it can be understood that the smaller the force acting on the body of the golfer is, the smaller the hit point variation is. Also, it can be understood from FIG. 4 that, based on the results of 11 out of the 13 test subjects, the force acting on the body of the golfer tended to be smaller when using the more flexible golf club. Also, it can be understood from FIG. 5 that, based on the results of 9 out of the 13 test subjects, the hit point variation tended to be smaller when using the more flexible golf club.

Figure 6:
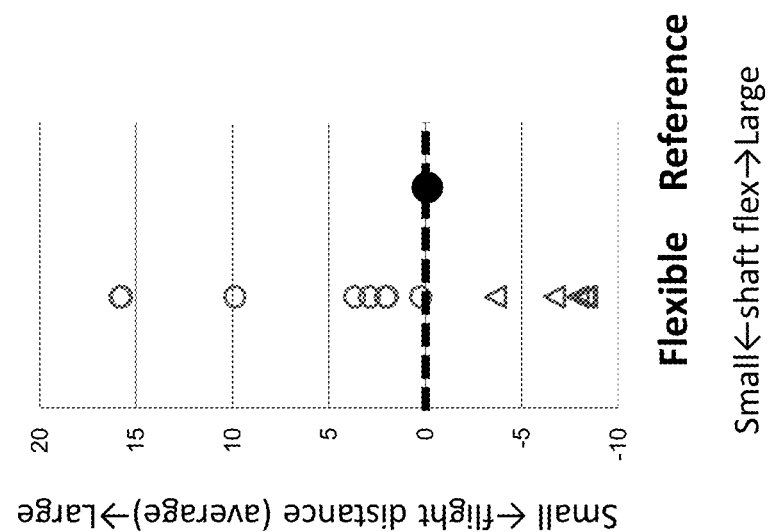
FIG. 6 is a graph showing a relationship between shaft flex and flight-distance (average).
Figure 7:
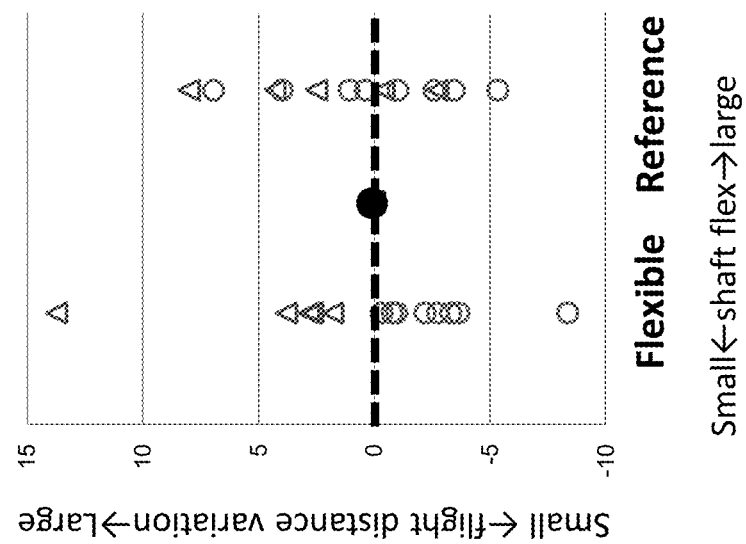
FIG. 7 is a graph showing a relationship between shaft flex and flight-distance variation.

Also, FIG. 6 is a graph showing the relationship between shaft flex and flight-distance (average), and FIG. 7 is a graph showing the relationship between shaft flex and flight-distance variation. More specifically, the vertical axis in FIG. 7 represents a value obtained by subtracting the flight-distance variation (standard deviation) when a test subject swung the reference golf club from the flight-distance variation (standard deviation) when the same test subject swung the flexible golf club. It can be understood from both of these figures that, based on the results of 8 out of the 13 test subjects, the more flexible the shaft is, the smaller the flight-distance variation tends to be, and furthermore the longer the flight-distance tends to be.

Based on the above, it was confirmed that the smaller the force acting on the body of the golfer is, the more stable golf swings are. Also, it was confirmed that the more flexible the golf club shaft is, the smaller the force acting on the body of the golfer is, and the more stable golf swings are.

2. First Embodiment

A method of evaluating the stability of a golf swing and an apparatus for the same that are based on the above-described findings and pertain to an embodiment of the present invention will be described below with reference to the drawings. First, the configuration of a system 100 that is an apparatus for evaluating the stability of a golf swing (referred to hereinafter as the evaluation system) according to the present embodiment will be described, and then a method of evaluating the stability of a golf swing that is executed using this system 100 will be described.

2-1. Configuration of Evaluation System

Figure 9:
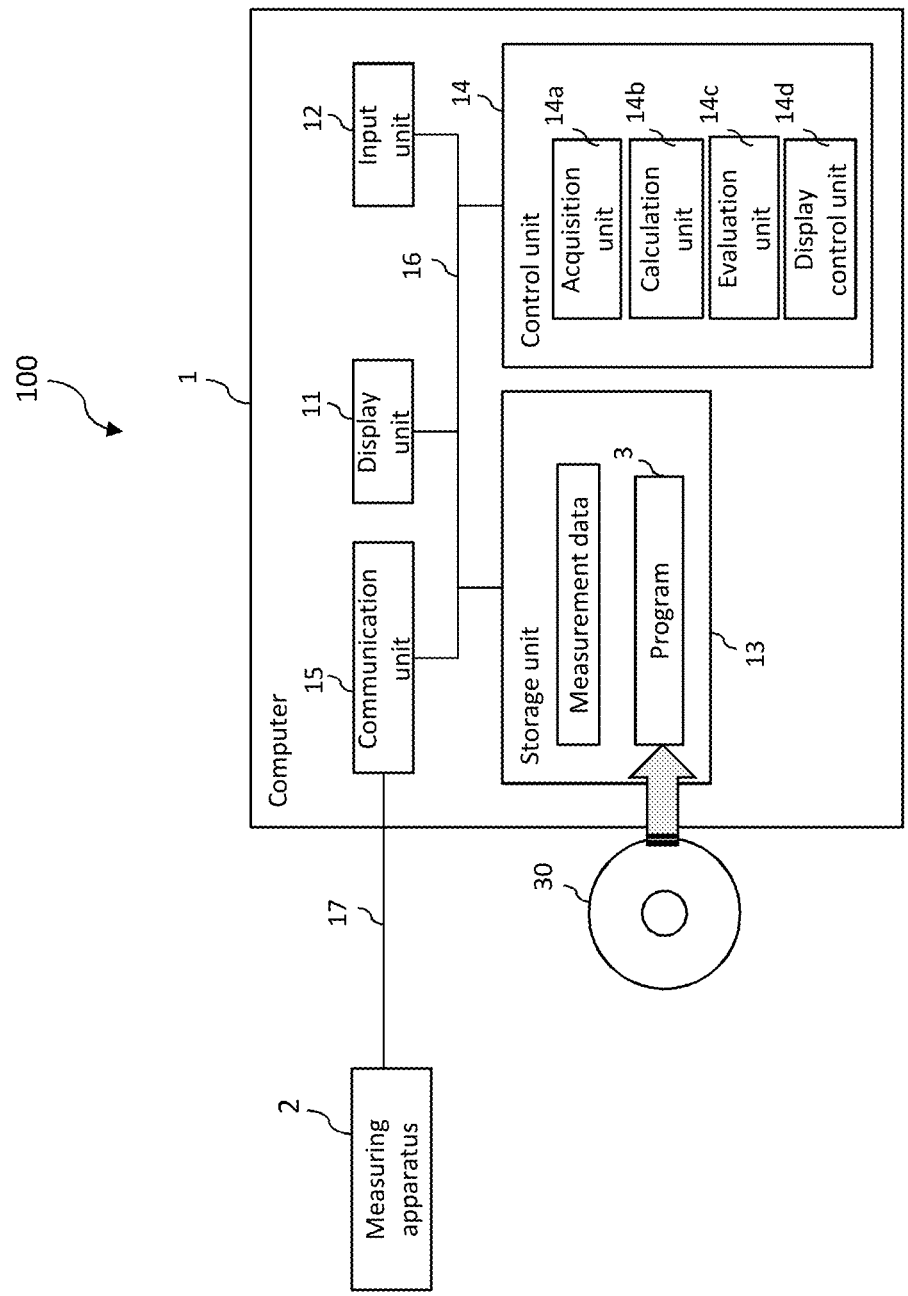
FIG. 9 is an overall structure diagram of a system for evaluating the stability of a golf swing.

FIG. 9 is an overall configuration diagram of the evaluation system 100. The evaluation system 100 includes a measuring apparatus 2 for measuring golf swings, and a computer 1 for analyzing measurement data output from the measuring apparatus 2.

2-1-1. Measuring Apparatus

The measuring apparatus 2 can be embodied in various aspects, and can be a three-dimensional movement analysis system that includes multiple cameras such as the system used in the experiment described above, for example. Alternatively, the measuring apparatus 2 can also be a three-dimensional movement analysis system that has an image shooting function and a distance measuring function. The cameras included in the measuring apparatus 2 are disposed at appropriate positions around a golfer. Measurement data (image data) obtained by the cameras is transmitted to the computer 1 via a communication apparatus provided in the measuring apparatus 2. The image shooting technique is not limited to an infrared technique, and a visible light technique can also be employed. Also, in the case where cameras are used, in order to improve analysis precision, it is preferable that light reflection markers are attached at various locations on body of the golfer, the golf club, and the like likewise to the case of the experiment described above.

As another example, the measuring apparatus 2 can also be an inertial sensor unit that includes an acceleration sensor and an angular velocity sensor, and the inertial sensor unit can include a magnetic field sensor. The measuring apparatus 2 can also be constituted by only an acceleration sensor or only an angular velocity sensor. This sensor unit can be attached at various locations on the golf club and the body of the golfer, and preferably can be attached in the vicinity of the grip end of the golf club or the vicinity of the grip on the golf club shaft. In this case, the presence of the sensor unit does not hinder the golf swing, and the golfer can be allowed to make a natural golf swing. Measurement data obtained by the sensor unit (data indicating acceleration, angular velocity, magnetic field, etc.) is transmitted to the computer 1 via a communication apparatus provided in the measuring apparatus 2.

A combination of a camera and sensor unit can also be used as the measuring apparatus 2. In particular, a measuring apparatus such as that disclosed in JP 2012-95789A for example can be employed for (1) head movement analysis, (2) hit point measurement, and (3) flight-distance measurement.

2-1-2. Computer

The computer 1 is a general-purpose computer in terms of hardware, and is realized as a desktop computer, a notebook computer, a tablet computer, or a smartphone, for example. The computer is manufactured by installing a predetermined program 3 in a general-purpose computer from a computer-readable recording medium 30 such as a CD-ROM, or via a network such as the Internet. The program 3 is software for analyzing golf swings based on measurement data received from the measuring apparatus 2, and causes the computer 1 to execute operations that will be described later.

The computer 1 includes a display unit 11, an input unit 12, a storage unit 13, a control unit 14, and a communication unit 15. These units 11 to 15 are connected to each other via a bus line 16, and are capable of communicating with each other. The display unit 11 can be constituted by a liquid crystal display or the like, and displays the results of golf swing analysis and the like to a user. Note that the "user" referred to here is a collective term for any person that needs golf swing analysis results, such as a golf goods developer, a golfer, or an instructor. The input unit 12 can be constituted by a mouse, a keyboard, a touch panel, or the like, and accepts operations performed by the user on the computer 1.

The storage unit 13 can be constituted by a hard disk or the like. The storage unit 13 stores the program 3, and also stores measurement data that is received from the measuring apparatus 2. The control unit 14 can be constituted by a CPU, a ROM, a RAM, and the like. By reading out and executing the program 3 in the storage unit 13, the control unit 14 virtually operates as an acquisition unit 14a, a calculation unit 14b, an evaluation unit 14c, and a display control unit 14d. Operations of the units 14a to 14d will be described in detail later. The communication unit 15 functions as a communication interface for receiving data from an external device such as the measuring apparatus 2.

2-2. Method of Evaluating Golf Swing Stability

A method of evaluating the stability of a golf swing according to the present embodiment will be described below with reference to FIG. 10.

Figure 10:
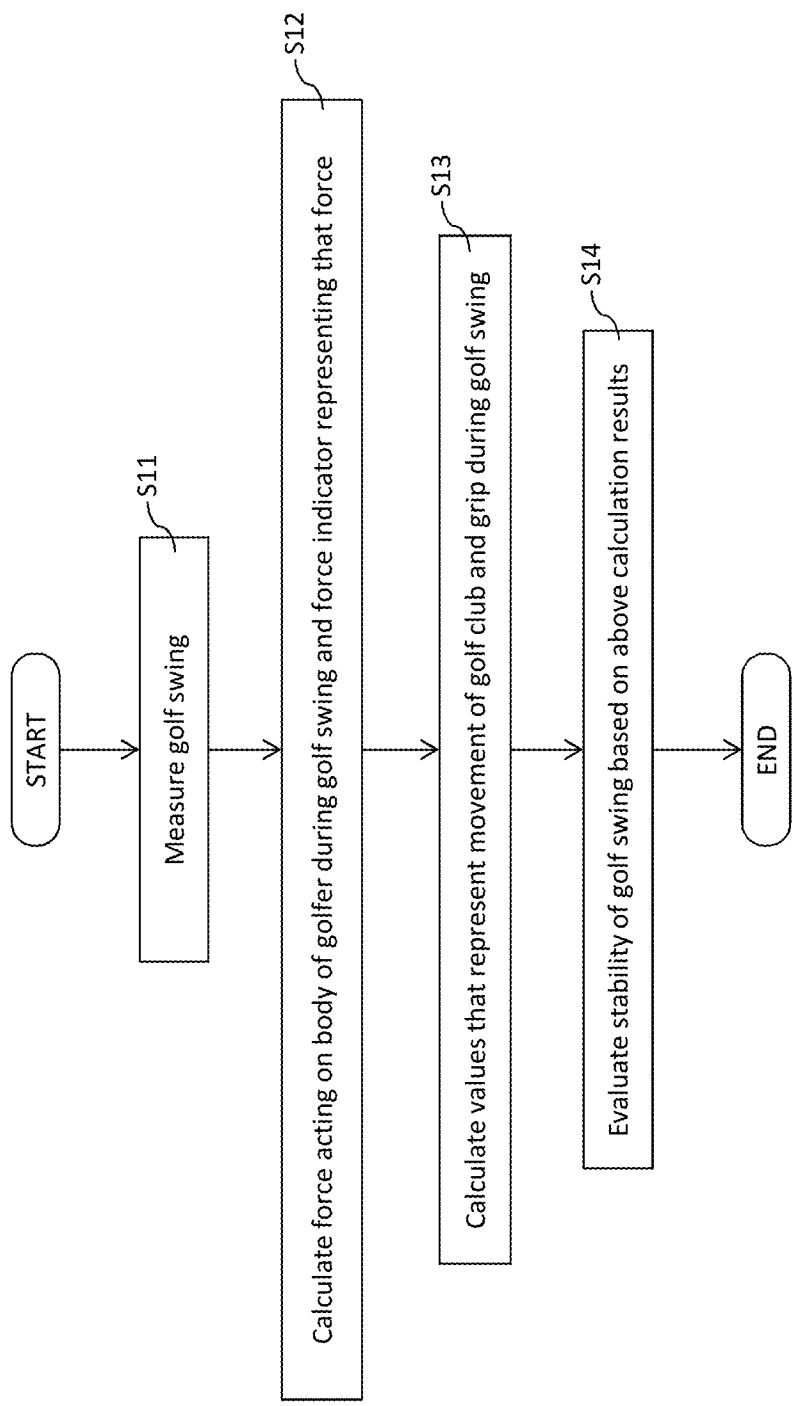
FIG. 10 is a flowchart showing a flow of a method of evaluating the stability of a golf swing.

As shown in FIG. 10, first, in step S11, a golfer is allowed to swing a golf club, and the swing is measured by the measuring apparatus 2. Measurement is performed in a period that is at least from the top of the swing to impact, and more preferably is at least from address to impact and continuing to finish. At this time, measurement data that expresses the movement of the golfer and the golf club during the golf swing is acquired by the measuring apparatus 2 in a time series with a short time interval, and is transmitted to the computer 1. In the computer 1, the time series measurement data that was output from the measuring apparatus 2 is acquired by the acquisition unit 14a via the communication unit 15, and is stored in the storage unit 13.

Next, in step S12, the calculation unit 14b reads out the time series measurement data from the storage unit 13 and calculates the force $F_S$ that acted on the body of the golfer during the golf swing, and also a force indicator that expresses that force. The force $F_S$ is force generated due to inertial force that includes centrifugal force. In the present embodiment, the force $F_S$ is calculated in a manner similar to that in the experiment described above. Specifically, the three-dimensional coordinates of points of interest on the golfer and the golf club (the left shoulder, the right shoulder, the thumb side of the left wrist, the pinkie side of the left wrist, and the upper end of the ferrule) are calculated based on the measurement data by the calculation unit 14b in a time series in a period that is at least from the top of the swing to impact. Note that the present invention is not limited to a three-dimensional movement analysis system such as that mentioned in the above description of the experiment, and it is possible to, for example, calculate the three-dimensional coordinates of the points of interest based on measurement data obtained by an inertial sensor unit. Also, various calculation methods for achieving this are known, and therefore a detailed description will not be given for them.

Then, based on the time series three-dimensional coordinates regarding the above-described points of interest, the calculation unit 14b uses inverse dynamics analysis to calculate, in a time series, the force $F_S$ in the period that is at least from the top of the swing to impact during the golf swing. At this time, a two-link rigid model is used, as described above. Also, in order to evaluate the force acting on the trunk of the golfer, the force acting at the shoulder position of the golfer is also calculated as the force $F_S$, as described above. Moreover, at this time, not only the three-dimensional coordinates of the points of interest, but also information regarding the golfer (the arm weight, the moment of inertia about the arm center of gravity, and the like) and information regarding the specifications of the golf club (the weight, the moment of inertia, and the like) are also input to the analysis model. Such information is acquired as appropriate via user input or the like.

Next, the calculation unit 14b calculates a force indicator as an indicator for evaluating the stability of a golf swing. In the present embodiment, the force indicator is the maximum value of the forward-backward component of the force $F_S$ in the period that is at least from the top of the swing to impact during the golf swing.

Next, in step S13, the calculation unit 14b calculates values that represent the movement of the golf club and the golfer during the golf swing based on the measurement data. For example, the calculation unit 14b calculates information indicating the position (trajectory), orientation, speed, acceleration, and angular velocity of the grip and the head of the golf club during the golf swing, as well as the head speed at the time of impact, the hit point on the face surface, the ball hitting angle (face angle), and the like. The ball flight-distance is also specified by calculation or user input. This information is stored in the storage unit 13 in association with the force $F_S$ and the force indicator.

Next, in step S14, golf swing stability is evaluated based on the calculation results described above. Specifically, the evaluation unit 14c converts the above-described force indicator into an indicator of golf swing stability in accordance with the magnitude of the force indicator. At this time, the smaller the force $F_S$ acting on the body of the golfer is, that is to say the smaller the force indicator is in the present embodiment, the higher the golf swing stability is determined to be. The indicator of stability can be expressed quantitatively such as 100 points, 50 points, or 20 points, or may be expressed qualitatively such as "good", "normal", and "needs improvement".

Note that in order to improve analysis precision, it is preferable that the indicator of stability is not calculated based on only the force indicator, but rather is calculated based on another indicator in addition to the force indicator. For example, the above-described force $F_S$ and force indicator are dependent on the golf club specifications, the golfer swing type, and the like as well. Accordingly, if a database defining the relationship between golf club specifications and force indicators (reference force indicators) and a database defining the relationship between golfer swing types and force indicators (reference force indicators) are stored in the storage unit 13 in advance, the force indicator calculated in step S12 can be converted into a more appropriate indicator of stability by referencing these databases. At this time, the golfer swing type can be determined via user input or based on various types of information calculated in step S13. Note that examples of the swing types referred to here include someone with high/low head speed, someone who hits a hook/slice ball, someone with an early/late cock release, and someone with large/small face rotation before impact.

Figure 11:
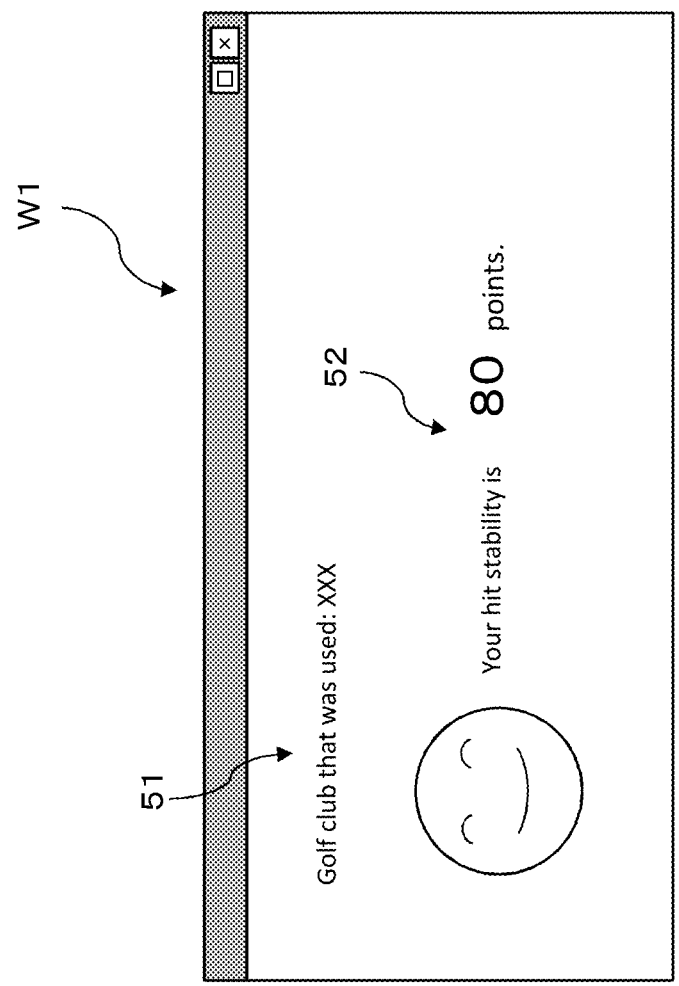
FIG. 11 is an example of a screen showing evaluation results for the stability of a golf swing.

The analysis results described above are output to the user as golf swing stability evaluation results. There are no particular limitations on the mode of output, and output can be audio output or vibration output, but typically the evaluation results are output visually on the display unit 11. In the present embodiment, a screen W1 such as the screen shown in FIG. 11 is displayed by the display control unit 14d. The screen W1 displays information 51 that specifies the golf club that was used, as well as information 52 for an indicator of golf swing stability with that golf club. As shown in FIG. 11, the information 52 can be displayed as text information, or can be displayed by an image that enables the user to intuitively understand the golf swing stability, such as an image of a person's face.

Figure 12:
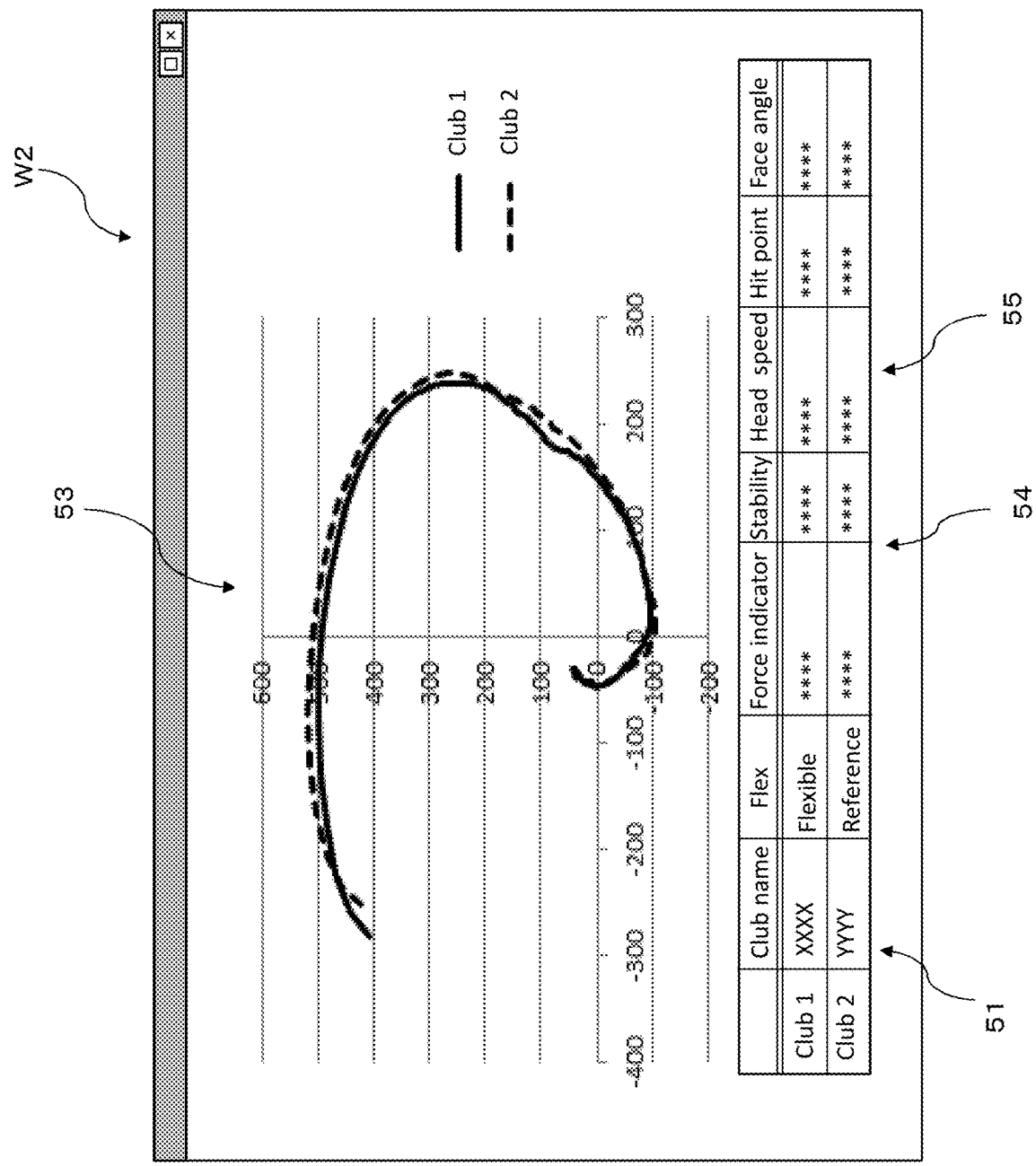
FIG. 12 is another example of a screen showing evaluation results for the stability of a golf swing.

Also, in the present embodiment, the display control unit 14d can also display a screen W2 such as the screen shown in FIG. 12 on the display unit 11. The screen W2 is a graph 53 that two-dimensionally represents the force $F_S$ from the top of the swing to impact. Note that this force $F_S$ can also be graphed three-dimensionally or one-dimensionally. Furthermore, in the screen W2, the information 51 that specifies the golf club that was used, information 54 on the force indicator and an indicator of stability, and information 55 calculated in step S13 are displayed in association with the force $F_S$. Accordingly, the user who views the screen W2 can become aware of the force $F_S$ that acted on the golfer during the golf swing, thus making it possible to give a deeper understanding of the force $F_S$ and the ball hitting stability evaluation results.

The mode of output described above is particularly suited to a fitting situation. On the other hand, in a golf goods development situation, a configuration is possible in which the screen W1 is omitted, and only the screen W2 is shown. In this case, the developer can evaluate golf swing stability by referencing the information displayed in the screen W2. In other words, the developer can make, on their own, a determination similar to the determination made by the evaluation unit 14c.

The evaluation method described above can be used preferably in the case where the same golfer or different golfers swing the same golf club or different golf clubs multiple times. In this case, it is possible to compare golf club characteristics and golfer characteristics, and it is possible to give a deeper understanding of golf swing stability.

In one typical example, consider the situation where the same golfer swings different golf clubs. In this case, steps similar to steps S11 to S13 are executed for each golf swing. Specifically, the force $F_S$, the force indicator, and values that represent the movement of the golf club and the golfer (and an indicator of stability in some cases) are calculated for each of multiple swings of multiple golf clubs made by the same golfer. Then, in step S14, the display control unit 14d displays, on the display unit 11, a screen displaying such information for each golf club. Note that the above-described screen W2 of FIG. 12 is an example of a screen in the case where multiple golf clubs are swung. The user then references this screen, compares the forces $F_S$ and the force indicators (and the indicators of stability in some cases) for the golf clubs, and thus compares the golf clubs in terms of golf swing stability. As a result, in a golf goods development situation for example, it is possible to find out which golf club is superior, and in a fitting situation, it is possible to find out which golf club is suited to the golfer. At this time, the user can reference the values that represent the movement of the golf club and the golfer.

Also, as another example, consider the case where multiple golfers swing the same golf club. In this case as well, steps similar to steps S11 to S13 are executed for each golf swing. Specifically, the force $F_S$, the force indicator, and values that represent the movement of the golf club and the golfer (and an indicator of stability in some cases) are calculated for each of multiple golf swings made by the multiple golfers. Then, in step S14, the display control unit 14d displays, on the display unit 11, a screen displaying such information for each golfer. The user then references this screen, compares the forces $F_S$ and the force indicators (and the indicators of stability in some cases) for the golfers, and thus compares the golfers in terms of golf swing stability. As a result, it is possible to perform golf swing analysis in the case where various golfers use a specific golf club for example, and these analysis results can be useful in golf goods development as well.

Note that in the case where the results of multiple golf swings are output as shown in screen W2, it is preferable that the results are displayed at the same time in the same screen in order to facilitate comparison. Also, it is preferable that a graph of the force $F_S$ is displayed at the same time in the same coordinate space.

3. Second Embodiment

Figure 13:
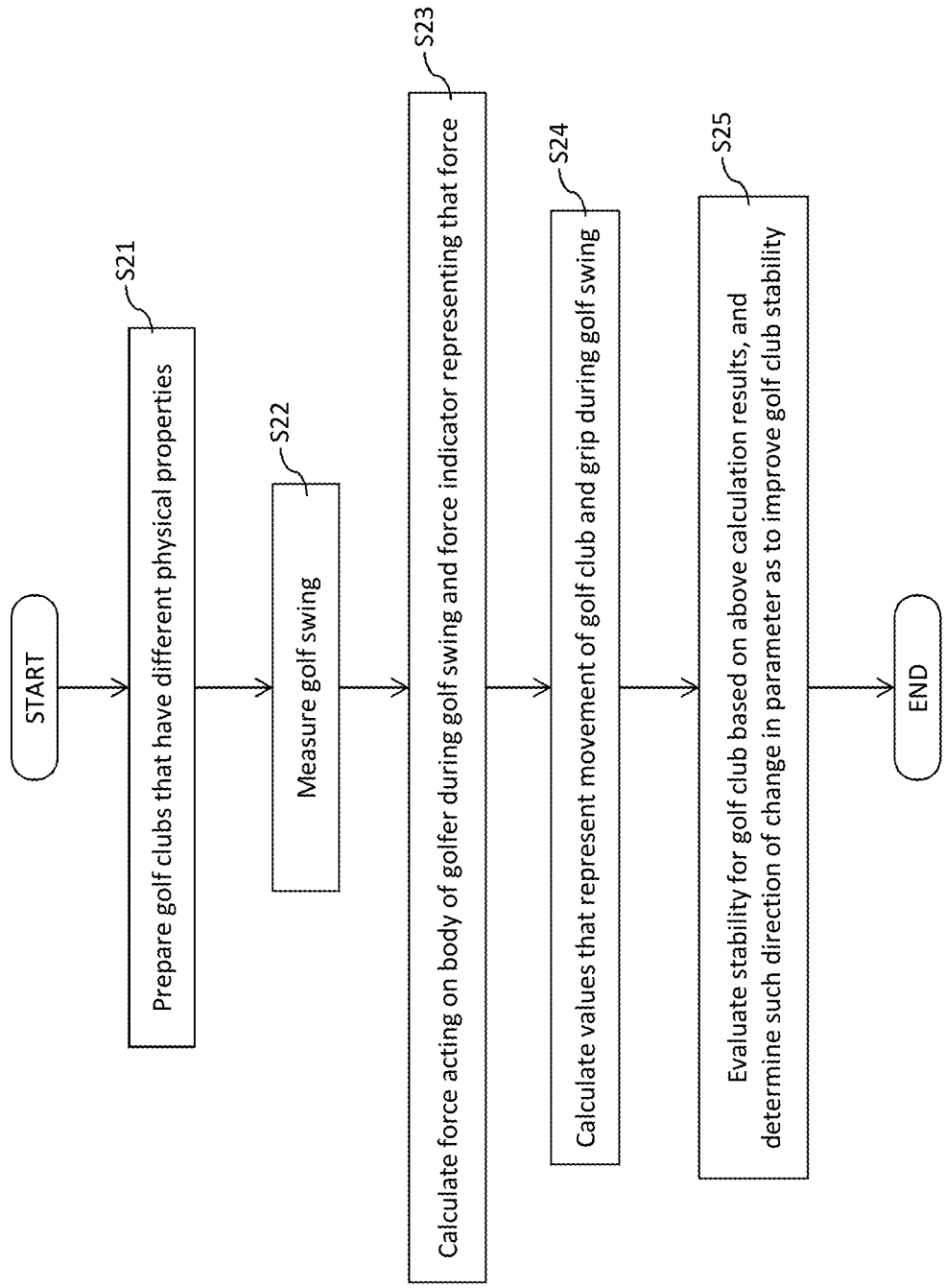
FIG. 13 is a flowchart showing a flow of a method of specifying a factor that determines the stability of a golf swing.

A method of specifying a factor that determines the stability of a golf swing that is based on the findings described above and pertains to an embodiment of the present invention will be described below with reference to FIG. 13. This method is carried out with use of an evaluation system 100 similar to that of the first embodiment. Also, this method is a method that is used mainly in a golf goods development situation, and by referencing a factor specified by this method, a golf club developer can determine which direction of advancement for golf club development will make it possible to improve golf swing stability.

3-1. Method of Specifying a Factor that Determines the Stability of a Golf Swing As shown in FIG. 13, in step S21, a user prepares multiple golf clubs that are different in terms of a parameter that indicates a physical propertys. The parameter referred to here may be any parameter, such as shaft flex, shaft weight, shaft length, and head weight, and is any parameter that is thought by the user to have a possibility of influencing the stability of a golf swing.

Next, steps similar to steps S11 to S13 are executed as steps S22 to S24 on each of the golf clubs prepared in step S21. Specifically, the golf clubs prepared in step S21 are swung by a golfer, and the swings are measured by the measuring apparatus 2 (step S22). Thereafter, the force $F_S$ and the force indicator are calculated by the calculation unit 14b for each golf swing (step S23), and values that represent the movement of the golf club and the golfer during the golf swings are calculated by the calculation unit 14b (step S24).

Next, in step S25, the calculation results for each of the golf clubs are displayed on the display unit 11 in a mode similar to that of step S14. The user then views the display and compares the golf clubs in terms of golf swing stability based on the magnitude of the force indicator. It is then investigated whether or not a relationship exists between the force indicator and the golf club parameter. For example, it is examined whether or not the force indicator tends to increase or decrease the higher the parameter is. If such a tendency is found, the user determines that that parameter is a factor that determines golf swing stability. Furthermore, the direction of change in that parameter along which the force indicator is reduced is determined, and that direction is determined to be a direction that improves golf swing stability. Also, at this time, the user can reference the values that represent the movement of the golf club and the golfer during the golf swing. For example, it is investigated whether or not there is a relationship between these values that represent movement and the parameter that improves golf swing stability and the change direction thereof. If there is a parameter that enables efficiently improving the flight-distance for example, it can be determined that that parameter is a particularly good factor.

By referencing a factor specified by this method, a golf club developer can determine a direction of advancement for golf club development that will achieve an improvement in golf swing stability. In other words, a golf club developer can find out a physical property that is to be focused on in golf club development, and can efficiently advance the development of a golf club that can achieve an improvement in golf swing stability.

4. Variations

Although embodiments of the present invention have been described above, the present invention is not limited to the above embodiments, and various modifications can be made without departing from the gist of the invention. For example, modifications such as the following can be made. Also, the matter of the following variations can be combined as appropriate.

4-1

Golf swings are actually measured in the above embodiments. However, instead of actually measuring golf swings, a configuration is possible in which golf swing simulation is carried out, and the force that acts on a golfer during a golf swing and a force indicator are calculated based on the simulation results. In this case, a virtual golfer and golf club are envisioned, models of the golfer and the golf club are created, and parameters such as torque exhibited by the virtual golfer are determined in advance. By then inputting these parameters regarding the virtual golfer and specification values for the virtual golf club to an analysis model, it is possible to calculate the force that acts on the body of the golfer and the force indicator.

4-2

In the above embodiments, a two-link rigid model is used as a model for analyzing golf swings made by a golfer, but any analysis method can be selected as long as it is possible to calculate the force that acts on the body of the golfer during a golf swing. For example, a model that is based on a finite element method can also be used as a model for representing a golf club (particularly the shaft portion). Also, although two-dimensional analysis was performed by projecting the three-dimensional coordinates of the position of interest onto the swing plane in the above embodiments, three-dimensional analysis may of course be performed.

4-3

In the above embodiments, the maximum value of the forward-backward component of the force acting at the shoulder position of a golfer during a golf swing was selected as the force indicator for evaluating the stability of a golf swing. However, the present invention is not limited to this example, and any indicator can be employed as the force indicator as long as it is possible to appropriately evaluate the stability of a golf swing. For example, it is also possible to specify a force indicator based on the force that acts at a different portion of the body of the golfer, such as the wrist. Also, the present invention is not limited to the forward-backward component of the golfer, and focus can also be placed on a component in another direction, such as a component in the left-right direction. Note that it is preferable that focus is placed on force that includes a forward-backward component. Also, instead of focusing on the maximum value of the force that acts on the body of the golfer during a golf swing, it is also possible to focus on a force that acts at any specific time, such as the time of impact, and focus can also be placed on the average value of force or the integral value of force that acts in a certain period. Note that the force $F_S$ and the indicator of stability that are described above are also one type of force indicator.

4-4

In the above embodiments, it is also possible to omit steps step S13 and S24 for example. Note that needless to say, analysis precision can be improved in the case where these steps are executed.

LIST OF REFERENCE NUMERALS

1 Computer
14b Calculation unit
14c Evaluation unit
2 Measuring apparatus
100 Evaluation system

What is claimed is:

1. A method of evaluating stability of a golf swing, comprising the steps of:
    acquiring a data representing a movement of a golf club and a golfer during the golf swing, the data being measured by a measuring apparatus or being simulated by a computer;
    calculating, based on the acquired data, a force indicator that represents an inertial force including a centrifugal force that acts on a trunk of a body of the golfer during the golf swing, the centrifugal force generated due to a movement of the golf club and arms of the golfer during the golf swing;
    displaying the calculated force indicator on a display unit; and
    evaluating stability of the golf swing according to a magnitude of the force indicator,
    wherein:
    the acquiring includes acquiring the data during golf swings that are respectively made with a plurality of golf clubs,
    the step of calculating includes calculating a plurality of the force indicators that respectively correspond to the golf swings made with the plurality of golf clubs,
    the step of displaying includes displaying the plurality of the force indicators on the display unit at the same time, and
    the step of evaluating includes comparing the plurality of golf clubs in terms of the stability of the golf swing by comparing the plurality of force indicators.

2. The method according to claim 1,
    wherein in the calculating, the force indicator is calculated during the golf swing made with a specific golf club, and
    in the evaluating, the stability of the golf swing is evaluated as a characteristic of the specific golf club, in accordance with the magnitude of the force indicator.

3. The method according to claim 2, wherein in the evaluating, the smaller the force that acts on the body of the golfer is, the higher stability of the golf swing is determined to be.

4. The method according to claim 2, wherein the force that acts on the body includes a component of a force that acts on the body of the golfer in a forward-backward direction.

5. The method according to claim 1, wherein in the evaluating, the smaller the force that acts on the body of the golfer is, the higher stability of the golf swing is determined to be.

6. The method according to claim 5, wherein the force that acts on the body includes a component of a force that acts on the body of the golfer in a forward-backward direction.

7. The method according to claim 1, wherein the force that acts on the body includes a component of a force that acts on the body of the golfer in a forward-backward direction.

8. The method according to claim 1, wherein in the calculating, the force indicator is calculated based on a result of actual measurement or simulation of the golf swing.

9. The method according to claim 1, further comprising the steps of:
    measuring a force acting at a center of a line connecting a left shoulder and a right shoulder of the golfer in a forward-backward direction as the centrifugal force acting in the trunk of the body of the golfer during the golf swing; and
    generating a graph to be displayed in a screen, the graph illustrating the centrifugal force during the golf swing, and the evaluated stability in association with the centrifugal force,
    wherein the force indicator is a maximum value of the measured force in the forward-backward direction in a period that is at least from a top of the golf swing to an impact during the golf swing.

10. A method of evaluating stability of a golf swing, comprising the steps of:
    acquiring a data representing a movement of a golf club and a golfer during the golf swing, the data being measured by a measuring apparatus or being simulated by a computer;
    calculating, based on the acquired data, a force indicator that represents an inertial force including a centrifugal force that acts on a trunk of a body of the golfer during the golf swing, the centrifugal force generated due to a movement of the golf club and anus of the golfer during the golf swing;
    displaying the calculated force indicator on a display unit; and
    evaluating stability of the golf swing according to a magnitude of the force indicator,
    wherein:
    the step of acquiring includes acquiring the data during golf swings that are respectively made by a plurality of golfers,
    the step of calculating includes calculating a plurality of the force indicators that respectively correspond to the golf swings made by the plurality of golfers, the step of displaying includes displaying the plurality of the force indicators on the display unit at the same time, and the step of evaluating includes comparing the plurality of the golfers in terms of the stability of the golf swing by comparing the plurality of force indicators.

11. A method of specifying a factor that determines stability of a golf swing, comprising:

acquiring a data representing a movement of a golf club and a golfer during each golf swing of a plurality of golf swings which are respectively made with a plurality of golf clubs, the data being measured by a measuring apparatus or being simulated by a computer;

calculating, based on the acquired data, a plurality of force indicators that each represent an inertial force including a centrifugal force that acts on a trunk of the body of a golfer during the golf swings made with the plurality of golf clubs, the centrifugal force generated due to a movement of the golf club and arms of the golfer during the golf swings, the plurality of golf clubs each having a different value of a parameter that indicates a physical property;

displaying the plurality of the force indicators on the display unit at the same time, and comparing the plurality of golf clubs in terms of the stability of the golf swing in accordance with magnitudes of the plurality of force indicators, and determining such a direction of change in the parameter as to improve the stability of the golf swing.

* * * * *